April 21, 1942.  W. A. FLUMERFELT  2,280,634
JOINT CONSTRUCTION
Filed June 5, 1940   2 Sheets-Sheet 2

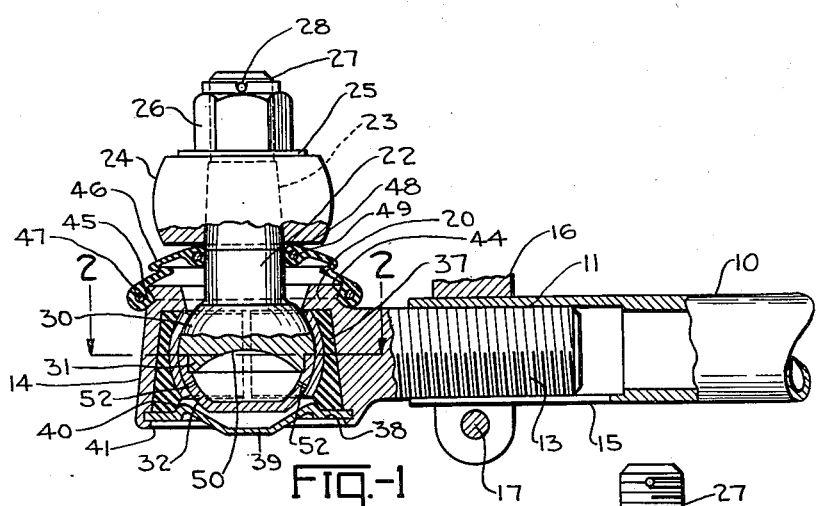

INVENTOR
William A. Flumerfelt
BY
Braselton, Whitcomb & Davies
ATTORNEY

Patented Apr. 21, 1942

2,280,634

UNITED STATES PATENT OFFICE 2,280,634

JOINT CONSTRUCTION

William A. Flumerfelt, Columbus, Ohio, assignor to The Columbus Auto Parts Company, Columbus, Ohio, a corporation of Ohio Application June 5, 1940, Serial No. 338,977

3 Claims. (Cl. 287—90)

This invention relates to joint constructions and more especially to those of a character known as ball joints particularly adaptable for use in the tie rod and drag link assemblies for automotive vehicles.

The invention has for an object the provision of a joint construction having a ball-like joint element of multi-sectional construction surrounded by bearing means, the component elements of the joint assembly being cushioned in a yieldable material.

The invention contemplates a ball type joint construction in which the spherical configuration is formed of a plurality of members and surrounded by a bearing means which engages the spherical configuration under pressure of a compressed rubber or synthetic rubber cushion.

Another object of the invention is the provision of a joint structure wherein metallic spring means have been eliminated and the elements of the joint assembly at all times are held together under pressure of a compressed yieldable material thus providing means for automatically compensating for any wear of the several bearing surfaces.

Another object of the invention resides in the provision of a joint structure which is of sealed construction with the lubricant initially injected into the joint at the time of assembly so that further lubrication of the structure during use becomes unnecessary.

Still another object of the invention is the provision of a sealed ball joint in which the ball construction is of hollow configuration providing a lubricant reservoir for the bearing surfaces of the joint construction.

Further objects and advantages are within the scope of this invention such as relate to the arrangement, operation and function of the related elements of the structure, to various details of construction and to combination of parts, elements per se, and to economies of manufacture and numerous other features as will be apparent from a consideration of the specification and drawings of a form of the invention, which may be preferred, in which—

Figure 1 is a vertical sectional view showing a joint construction of my invention;

Figure 2 is a horizontal sectional view taken substantially on the line 2—2 of Figure 1;

Figure 3 is an elevational view partly in section of a stud member forming an element of the joint construction;

Figure 4 is an elevational view partly in section illustrating one of the elements utilized in forming the ball configuration of the joint structure;

Figure 5 is an elevational view showing one form of bearing means employed in the joint construction;

Figure 6 is a horizontal section view of the bearing means taken substantially on the line 6—6 of Figure 5;

Figure 7 is a detailed view showing the cushion of yieldable material and a bearing means;

Figure 8 is an elevational view partly in section illustrating a closure for the bottom of the joint housing;

Figure 9 is an elevational view partly in section illustrating a flexible closure for the upper end of the housing.

Figure 10 is an elevational view partly in section illustrating a modified form of stud and ball configuration;

Figure 11 is a view similar to Figure 7 illustrating a modified form of bearing construction for the ball configuration;

Figure 12:
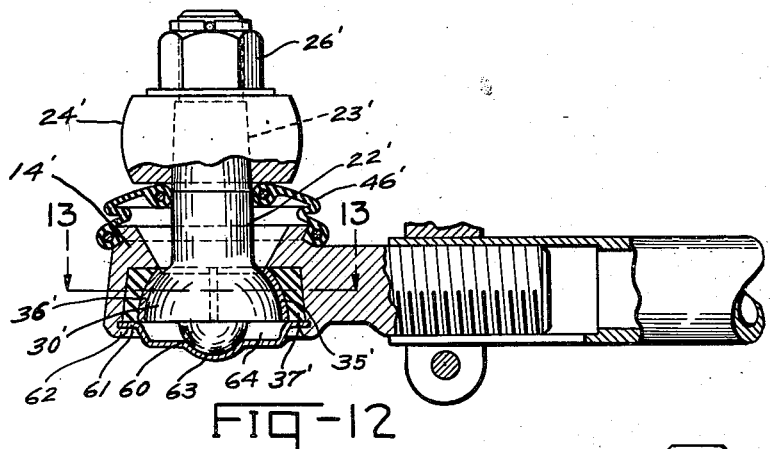
Figure 12 is a vertical sectional view illustrating a modified form of the joint construction.
Figure 13:
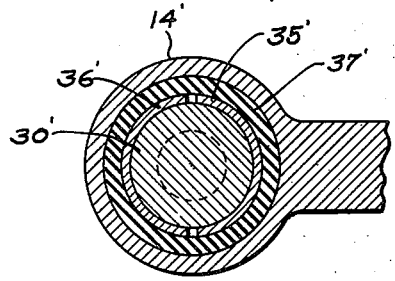
Figure 13 is a horizontal sectional view taken substantially on the line 13—13 of Figure 12.
Figure 14:
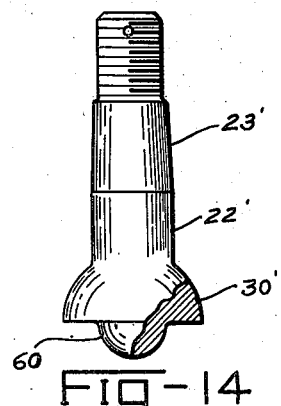
Figure 14 is a detailed view of the stud element forming part of the invention.
Figure 15:
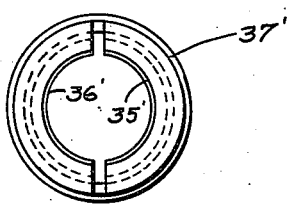
Figure 15 is a plan view of the bearing seats and flexible mounting therefor.

While I have illustrated the joint construction as especially adapted for a tie rod connection, it is to be understood that my invention may be used in any arrangement where it may be found to be applicable.

Referring to the drawings in detail, I have shown a form of joint construction especially arranged for making a tie rod connection to a dirigible or steerable wheel of a vehicle in which numeral 10 designates a tie rod of tubular formation which is interiorly threaded as at 11 to receive a threaded tenon 13 formed as an integral part of a joint housing 14. The wall of the tube adjacent tenon 13 is split longitudinally as at 15 and surrounding the tube is a clamp or collar 16 arranged to be drawn into clamping engagement with tie rod tube 10 by means of bolt 17 and nut (not shown), this means serving to lock the tie rod tube and joint housing in fixed relation. The housing 14 is of hollow configuration which terminates at its upper extremity in an inwardly extending shoulder or flange 20, the interior walls of the housing 14 tapering or converging slightly at the upper portion of the housing.

Extending into the housing is a stud member 22 having a tapered shank portion 23 adapted to receive an arm 24 which forms part of a means for supporting a dirigible vehicle wheel (not shown), the arm 24 being held in place by means of a washer 25 and a nut 26 engageable with a threaded tenon 27 integrally formed upon the upper end of stud 22, the nut being locked in position by means of a cotter key 28 or other locking means. The lower extremity of the stud 22 is formed with a segmental spherical or partial ball shaped portion 30 which terminates in a cylindrical flange portion 31 of lesser diameter than the ball shaped portion and positioned immediately beneath the segmental spherical portion 30 of the stud is a cup-like member 32 also formed with a segmental spherically shaped exterior of the same radius of curvature as the spherical shape of portion 30 of stud 22. The exterior surface of portion 30 of the stud and the curved exterior surface of member 32 form together substantially a ball shaped configuration. The member 32 is preferably formed of sheet metal or the like and is provided at its upper interior edge with a cylindrical surface 34 which snugly fits over the flange portion 31 of the stud member.

In the form of the invention shown in Figure 1, the ball configuration formed by portion 30 and cup-like member 32 are substantially surrounded by a bearing means in the form of two semi-annular metallic bearing members 35 and 36. Interposed between the bearing members and the interior converging wall of the joint housing is a member or cushion 37 of yieldable material which may be of rubber, synthetic rubber, or the like. In this form of the invention it is preferable that the rubber cushion 37 be bonded or caused to adhere to the exterior surface of the bearing seats 35 and 36 for purposes of assembly but the elements may be assembled separately without departing from the spirit of the invention. The lower portion of the housing is sealed by means of a circular disk-like closure or member 38 having a centrally depressed portion 39 and an upwardly extending circular raised portion 40, the closure being held in place by swaging a peripheral flange portion of the housing over the edge of the closure disk as illustrated at 41. In assembling the joint elements and rubber cushion 37, the latter would normally extend downwardly below the position of the disk 38. However, it is desirable that the cushion 37 be substantially compressed by the disk 38 in order that the cushion exert substantial lateral pressure against the bearing means or seats 35 and 36 to hold the latter in constant operable engagement with the ball configuration of the stud and member 32, and thus automatically compensate for any wear of the bearing elements of the joint. The upwardly extending circular raised portion or shoulder 40 on the closure disk 38 serves to prevent the compressed rubber cushion 37 from "creeping."

The upper portion of the housing 14 is provided exteriorly with a peripheral groove or recess 44 and fitting into this recess is a circular bead 45 integrally formed as a part of a flexible boot 46 of rubber or other suitable flexible material. As illustrated in Figures 1 and 9, the beading 45 is preferably provided with a metal wire reinforcement 47 which serves to retain the beading 45 in the groove 44 of the housing to form a seal. The upper portion of the boot structure 46 is also provided with a beading 48 which is also formed or moulded with a wire reinforcement 49, the beading 48 surrounding the stud member adjacent the lower surface of the arm 24 and adhering to the stud member 22 providing a seal between the boot and the stud member.

It is to be noted that the stud member 22 is provided at its lower extremity with a concavity 50 which, with the interior of the hollow cup-like member 32 forms a lubricant reservoir. The space between the lower surface of the cup member 32 and closure 39 also forms additional lubricant reservoir. During the assembly of the joint structure, the concavity 50, hollow portion of cup 32 and the space between the lower surface of cup 32 and closure 39 are filled with suitable lubricant, and with the upper portion of the housing sealed by the flexible boot 46, there is provided a completely lubricated and sealed joint structure embodying an ample supply of lubricant for the bearing surfaces. Thus the bearing surfaces will remain in satisfactory operating condition throughout the life of the joint structure without further lubrication. While the lubricant will seep through the annular crevice at the juncture of the spherical portion 30 of the stud member with the cup 32, it may be desirable to provide additional openings 52 to enhance the flow of lubricant to the bearing surfaces of members 35 and 36. It should be noted that the bearing members 35 and 36 are independent of each other except for their being bonded to the rubber cushion 37, and the latter being resilient, may be sufficiently stretched during assembly operation to permit bearing members 35 and 36 to surround the ball configuration of the stud member and cup 32.

Thus, in the joint structure of my invention, all mechanical spring devices have been eliminated for holding the joint elements in their proper relationship as the rubber cushion 37 provides the necessary resilient lateral pressure upon the bearing surfaces forming an effective yet highly efficient joint construction, the resilient cushion automatically compensating for any wear of the bearing surfaces which may occur.

In Figure 10, I have illustrated a form of stud member wherein the cup member 32' forming a part of the ball shaped configuration 30' of the stud member is welded to the stud member as at 54. By this means the ball shaped configuration of the joint is thus formed as a unitary element and yet provide a ball shaped element which is substantially hollow to form a reservoir for lubricant as well as effecting a saving in weight and material.

Figure 11 illustrates a modified form of bearing construction for the ball joint in which the rubber cushion 37' is provided on its interior concave surface with a flexible fabric bearing material 55 as for example, corded fabric, canvas or the like. In this form of the invention the material 55 is bonded to the rubber cushion 37' but the same is of such weave as to be capable of being stretched over the ball configuration of the joint structure.

I have found it desirable to utilize a graphite bearing lubricant in a joint of the constructions above described or a lubricant which does not have serious deleterious effect upon the rubber thus avoiding any disintegration or impairment of the rubber cushion which retains the bearing means in contact with the ball configuration.

In the form of my invention illustrated in Figures 12 to 17 inclusive, there is provided the housing 14' similar in construction to that illustrated in Figure 1, said housing having converging or tapered interior walls. The stud member 22' in this form of the invention is provided at its lower extremity with an enlarged semi-spherical portion 30' and with a second semi-spherical portion 60 of lesser dimension, the curvature of both the spherical portions 30' and 60 being generated about the same center. The stud member 22' like the form shown in Figure 1, is provided with an upwardly extending tapered portion 23' adapted to receive arm 24' which is held in place by means of nut 26'.

Figure 17:
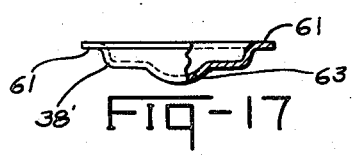
Figure 17 is an elevational view partly in section illustrating a closure element for the joint.
Figure 16:
Figure 16 is a side elevational view partly in section of the elements shown in Figure 15.

Substantially surrounding the spherical portion 30' of the stud member are a pair of semi-annular bearing seats or members 35' and 36' which are slightly spaced apart to take up for any wear of the bearing surfaces. Interposed between the bearing seat members 35' and 36' and the interior walls of the housing 14' is an annular member 37' of rubber, synthetic rubber or other suitable flexible or yieldable material which at all times urges the bearing seats 35' and 36' into close bearing engagement with the enlarged portion 30' of the stud member. The lower portion of the housing is closed by means of a closure plate 38', the outermost flange 61 thereof engaging and compressing the rubber mounting 37' for the bearing seats, the housing being swaged over the flange portion 61 as at 62 to hold the joint elements in assembled relationship. It is to be noted that in Figure 16 the yieldable rubber element 37' in unassembled position extends downwardly below the bearing seats 35' and 36' and during assembly, the flange 62 of closure member 38' compresses the rubber mounting into the position illustrated in Figure 12, the flange 62 also serving to hold the bearing seats 35' and 36' in position in the housing. The central portion of the closure member 38 is provided with a partial spherical recess 63 which is adapted for engagement as illustrated in Figure 12 with the small spherical portion 60 of the stud member 22' which provides additional bearing surface in the joint structure and at the same time the closure plate holds the stud element in close bearing engagement with the bearing seat members. As illustrated in Figures 12 and 17 the closure plate 38' is so formed as to provide a chamber 64 between the enlarged portion 30' of the stud member and the closure plate to form a lubricant chamber which may be initially filled with suitable lubricant at the time the joint is assembled. The upper end of the housing is closed by a suitable flexible closure member or boot 46' which may be of the same construction as in the form of the invention illustrated in Figure 1.

In this form of the invention the overall dimension of the joint housing is diminished over prior constructions and a satisfactory joint produced with a minimum number of elements. Also, a joint of this arrangement may be lubricated at the time of assembly with sufficient lubricant to last for the normal life of the joint structure.

It is apparent that, within the scope of the invention, modifications and different arrangements may be made other than is herein disclosed, and the present disclosure is illustrative merely, the invention comprehending all variations thereof.

What I claim is:

1. A joint construction including a housing having a hollow interior; a stud member having a segmental spherically shaped portion extending into said housing; a second hollow member provided with lubricating passages positioned beneath said stud member and having its exterior surface of spherical shape providing a continuation of the spherical shape of said stud member and adapted to form therewith a substantially hollow ball-shaped configuration adapted to contain a lubricant; bearing means in said housing substantially surrounding said ball-shaped configuration; a flexible integrally formed annular cushion interposed between said bearing means and the interior walls of said housing; and means bearing against and compressing said flexible cushion whereby the latter urges said bearing means into close engagement with said ball configuration.

2. A joint construction including a housing having a hollow interior; a stud member having a segmental spherically shaped portion extending into said housing, the extremity of said stud member in said housing presenting a concave configuration; a cup-like member forming a continuation of said stud member and having a spherical exterior surface forming a continuation of the spherical portion of said stud member providing a ball-shaped configuration, said cup-like member having openings for the passage of a lubricant and forming with the concave extremity of said stud member a reservoir for containing lubricant; a pair of semi-annular bearing elements in said housing having curved interior surfaces fitting the spherical shape of said ball-shaped configuration; a yieldable integrally formed annular element surrounding said bearing elements and engageable with the interior walls of said housing; a closure for the lower end of said housing having an annular raised portion and arranged to exert pressure on said yieldable member for urging said bearing elements into engagement with the ball-shaped configuration; and a flexible closure for the upper end of said housing having portions engaging said housing and said stud member to form a seal.

3. A joint construction including a housing having a hollow interior; a stud member having a segmental spherically shaped portion extending into said housing, a cup-like member provided with a plurality of lubricating openings forming a continuation of said stud member and having a spherical exterior surface forming a continuation of the spherical portion of said stud member providing a hollow ball-shaped configuration constituting a reservoir for containing a lubricant, a hollow integrally formed yieldable element in said housing; a flexible bearing means formed on the interior of said yieldable element, said flexible bearing means adapted to surround and engage the ball-shaped configuration; a metal closure for the lower portion of said housing; and flexible closure means for the upper end of said housing.

WILLIAM A. FLUMERFELT.